United States Patent [19]

Kouyama et al.

[11] Patent Number: 4,587,605
[45] Date of Patent: May 6, 1986

[54] INVERTER-DRIVE CONTROLLING APPARATUS

[75] Inventors: Kazumi Kouyama, Otsu; Takashi Deguchi; Masahiro Kadono, both of Kusatsu; Shigeki Harada, Takatsuki, all of Japan

[73] Assignee: Matsushita Electric Industrial Co., Ltd., Kadoma, Japan

[21] Appl. No.: 692,183

[22] Filed: Jan. 17, 1985

[30] Foreign Application Priority Data

Jan. 19, 1984 [JP] Japan .................................. 59-8002
Jan. 19, 1984 [JP] Japan .................................. 59-8003
Jan. 19, 1984 [JP] Japan .................................. 59-8004

[51] Int. Cl.⁴ ............................................. H02M 1/14
[52] U.S. Cl. ........................................ 363/41; 363/98; 364/131; 364/480; 364/483; 318/811
[58] Field of Search ................... 363/41, 43, 97–98, 363/132; 364/131, 480, 483, 484, 486; 318/801, 810–811

[56] References Cited

U.S. PATENT DOCUMENTS

| | | | |
|---|---|---|---|
| 4,166,247 | 8/1979 | Miyazawa | 363/41 X |
| 4,290,108 | 9/1981 | Woehrle et al. | 363/41 X |
| 4,337,429 | 6/1982 | Stuart | 318/811 |
| 4,348,734 | 9/1982 | Dougherty | 363/41 X |
| 4,387,421 | 6/1983 | Zach et al. | 318/811 X |
| 4,447,786 | 5/1984 | Saar et al. | 363/41 X |
| 4,458,194 | 7/1984 | Geppert et al. | 318/811 |
| 4,466,070 | 8/1984 | Claussen | 364/480 |
| 4,520,437 | 5/1985 | Boettcher, Jr. et al. | 363/41 |

Primary Examiner—Peter S. Wong
Attorney, Agent, or Firm—Cushman, Darby & Cushman

[57] ABSTRACT

In a controlling apparatus for a simulated sinusoidal wave of unequal width PWM inverter, wherein PWM signal comprises a data region and a HALT region in each of carrier period timer, the carrier period timer $T_0$ and data unit timer $T_2$ are controlled by each other independent digital values by each other independent microcomputers (5, 6) or by use of each other different timers (10, 11), and the data unit timer $T_2$ is controlled by an output of a power source voltage fluctuation detector (18), thereby to provide a constant voltage-frequency characteristic even at voltage fluctuation.

12 Claims, 30 Drawing Figures

FIG.4 (PRIOR ART)
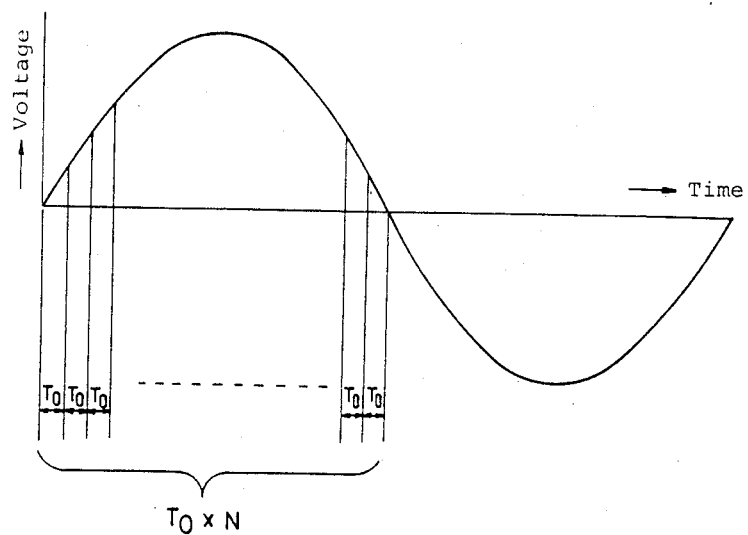
FIG.5 (a) (PRIOR ART)
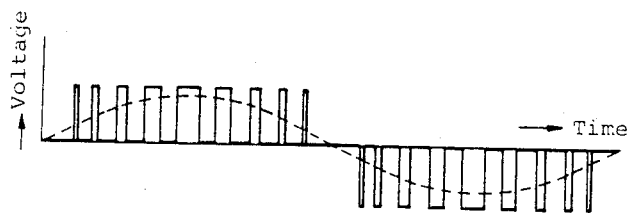
FIG.5 (b) (PRIOR ART)
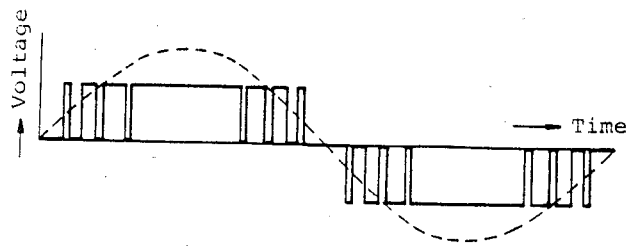

FIG.9 (PRIOR ART)
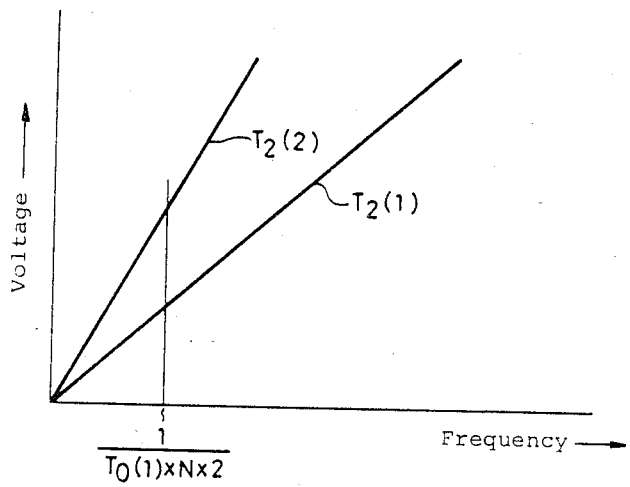
FIG.10 (a) (PRIOR ART)
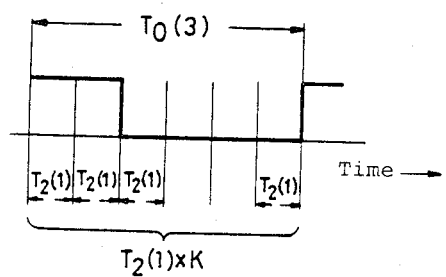
FIG.10 (b) (PRIOR ART)
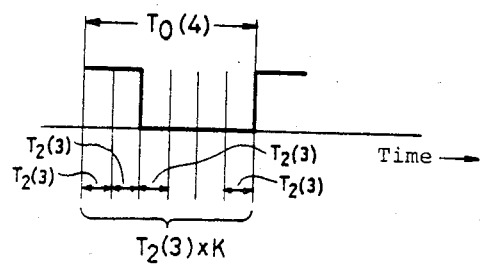

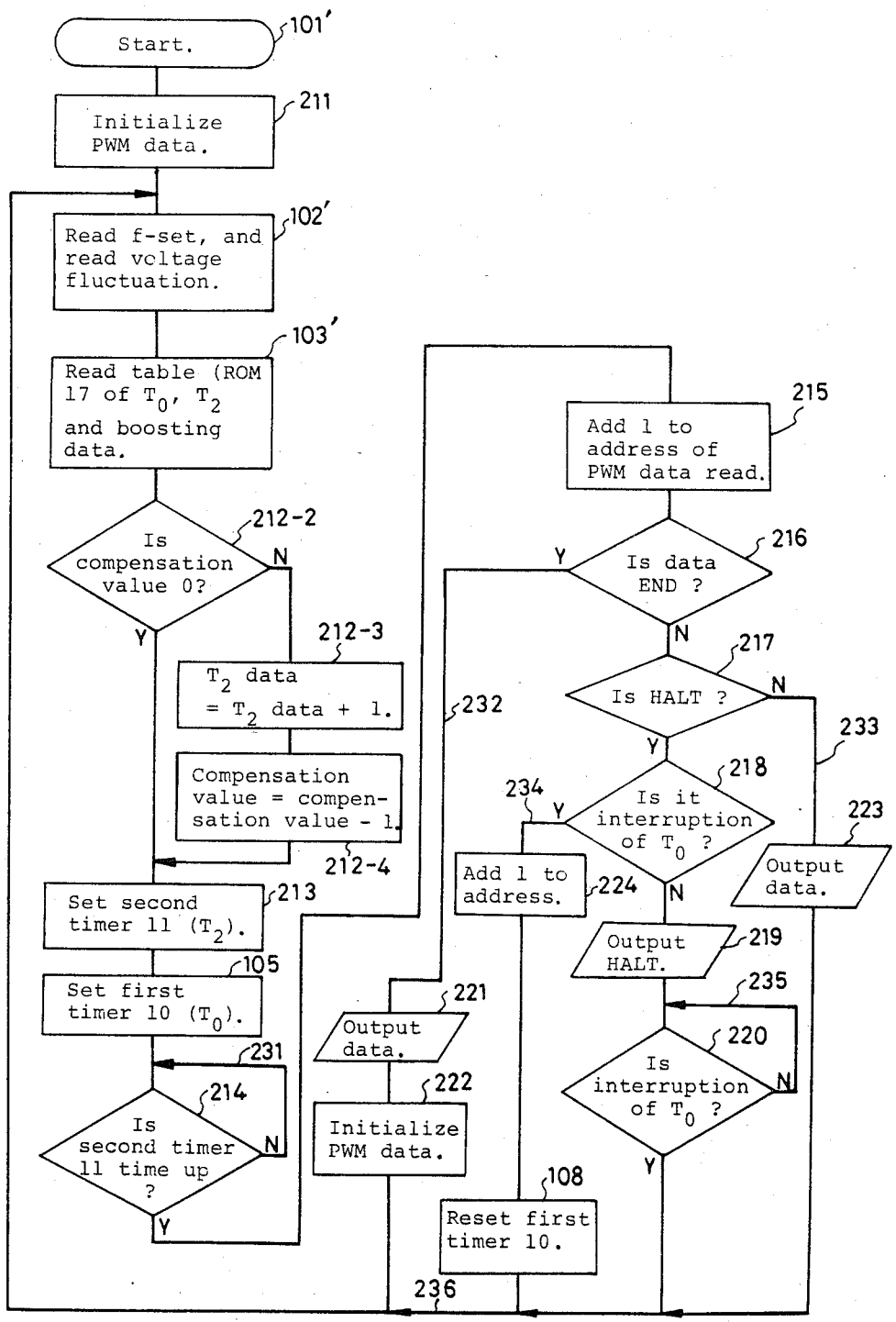

INVERTER-DRIVE CONTROLLING APPARATUS

BACKGROUND OF THE INVENTION

1. Field of the Invention

The present invention relates generally to an inverter-drive controlling apparatus, and particularly concerns the inverter-drive controlling apparatus which is especially suitable for drive-controlling operation of an induction motor of a relatively small output power for industrial use such as for a compressor of air conditioner, or refrigerator, or the like.

There are several known types of control apparatus for inverter to drive a motor, such as of PAM, PWM type. Among them, PWM of inequal width simulated sinusoidal wave is superior in power source utility, miniaturization and light weight of apparatus, low noise of electromagnetic wave, low mechanical noise, low vibration, etc., and becomes major trend in recent years.

The PWM of simulated sinusoidal wave is that which is, as shown in FIG. 3 and FIG. 5, a system to produce PWM algorithm in a manner to simulate the sinusoidal wave with integral value of pulse voltage fed to motor winding.

Now, a prior art of HALT system, which is a basis to make the present invention, is elucidated as the prior art, with reference to FIG. 1, FIG. 2, FIG. 3, FIG. 4, FIG. 5, FIG. 6, FIG. 7, FIG. 8, FIG. 9, FIG. 10, FIG. 11 and FIG. 12. In FIG. 1, alternate current from a commercial power source E is rectified and smoothed by a rectifier-smoother 1, and the rectified and smoothed DC output from the rectifier-smoother 1 is given to an inverter 2, and the output of the inverter 2 is fed to an electric motor 3, and an inverter drive controlling circuit 4 gives the inverter 2 a controlling signal.

Nextly, one example of the general inverter system constituted for an air conditioner is shown in FIG. 2.

In FIG. 2, numerals 1, 2, 3 and 4 designate the rectifier smoother 1, inverter 2, electric motor 3 and inverter drive controlling circuit 4 of FIG. 1, respectively, and the inverter drive controlling circuit comprises a PWM algorithm generator 4a and a base current driver for supplying base currents to the basses of transistors $Tr_1$, $Tr_2$, $Tr_3$, $Tr_4$, $Tr_5$, $Tr_6$ in the inverter 2 and a photo-coupler 4b which couples the PWM algorithm generator 4a and the base current driver 4c in insulated manner.

Signals generated by the PWM algorithm generator 4a are amplified and conveyed by the photo-coupler 4b and given to the base current driver 4c, and after current amplification the signals are given to the inverter 2. In the inverter 2, the transistor pairs $Tr_1$ and $Tr_2$, $Tr_3$ and $Tr_4$, and $Tr_5$ and $Tr_6$ each constitute inverter switches and either one of each transistor in the pair is selectively turned on at a time. Junction point between the transistor pairs are connected to three terminals UVW of the electric motor 3 of a compressor of an air conditioner.

FIG. 3 shows wave forms of signals to be applied to the bases of the transistors $Tr_1$ through $Tr_6$, and waveforms of voltages to be applied across the windings of electric motor 3. In FIG. 3, waveforms U, V and W correspond to the signals applied to the bases of the transistors $Tr_1$, $Tr_3$ and voltages to be applied across the windings of electric motor 3. In FIG. 3, waveforms U, V and W correspond to the signals applied to the bases of the transistors $Tr_1$, $Tr_3$ and $Tr_5$. U—V, V—W and W—U are waveforms of voltages applied to respective windings of the electric motor 3.

As shown in FIG. 3, the waveforms of the voltages are designed to be simulated to sinusoidal wave when integrated, and period of the pattern of this voltage determines revolution number of the electric motor 3.

Now, PWM algorithm is elucidated with reference to FIG. 4 which elucidate concept of carrier. Half period of the sinusoidal wave of FIG. 4 is equally divided by an integer N. This integer N is called "carrier", and the small period $T_0$ made by dividing the half period of the sinusoidal wave by the carrier N is called "carrier period". By issuing pulses in respective period $T_0$ with pulse widths responding to voltage at that divided period $T_0$ of the sinusoidal wave, the algorithm as shown by FIG. 3 is produced.

Nextly, voltage value to be applied to the coils of the electric motor 3 is elucidated with reference to As shown by FIG. 5(a), it is provided that pulses of a predetermined voltage and having pulse widths corresponding to a sinusoidal wave having a value of an integral of the pulses are generated by means of an algorithm. When the pulse widths of the pulses are increased in proportional way, the waveforms become as shown in FIG. 5(b), namely, the value of integral of the pulses increases. Accordingly, the amplitude of the sinusoidal wave can be controlled by changing of the pulse widths.

Nextly, relation between the pulse widths which defines the output voltage (amplitude of the sinusoidal wave) and HALT is elucidated with reference to FIG. 6(a) and FIG. 6(b). FIG. 6(a) shows a situation wherein the carrier period $T_0$ comprises plurally divided times of region of data, and the HALT region si defined as the remaining time in the carrier period $T_0$ such as $T_0(i)$. It is defined that in this HALT region, no voltage data is output. Now, it is provided that time period of the data region is sufficiently smaller in comparison with the carrier period $T_0(1)$, as shown in FIG. 6(a).

And nextly, it is provided that, as shown in FIG. 6(b), carrier period $T_0$ is halved into $T_0(2)$ from that of $T_0(1)$, and that the time period of the data region is unchanged. Then, frequency f of the carrier becomes 2-times (since carrier period $T_0(2) = \frac{1}{2} \cdot T_0(1)$), and output voltage is also doubled. This is because that the relative pulse widths with respect to the carrier period $T_0(2)$ is 2-times of the pulse widths with respect to the carrier period $T_0(1)$.

A small time unit is defined by dividing the time period of the data region DATA of FIG. 6(a) and FIG. 6(b) by an integer K, and this time unit is named as "data unit timer $T_2$".

Then, by fixing the data unit timer $T_2$ to a constant length and changing the carrier period $T_0$, the frequency f is changed in an inverse proportion, and output voltage is changed in proportion to the frequency. Responding to the change, the HALT period, which is the period when no data is produced, also changes.

The above-mentioned frequency-output voltage relation is shown in FIG. 7.

Now, further detailed description is made with respect to the data region, with reference to FIG. 8(a) and FIG. 8(b). In these time charts, a sampled voltage is represented by the unit timers $T_2$ of a number responding to the value of the sampled voltage, and therefore, the voltage is represented by a logic pattern having K resolution.

Naturally to say, when the carrier N and the integer K are selected as larger number, the waveform of the voltage to be applied to the electric motor is made more smoothly simulated sinusoidal wave.

As shown in FIG. 8(a) and FIG. 8(b), both cases have the same carrier period $T_0(1)$, but the data unit timer $T_2(1)$ of FIG. 8(a) is only half length of time of the data unit timer $T_2(2)$ of FIG. 8(b). Accordingly, the data region time length $T_2(2) \times K$ of FIG. 8(b) is 2-times of the data unit timer $T_2(1) \times K$ of FIG. 8(a), and HALT time of FIG. 8(b) accordingly becomes smaller than the HALT time of FIG. 8(a). In these cases, the output voltage of FIG. 8(b) is 2-times the output voltage of FIG. 8(a). Accordingly, the frequency-voltage graph of FIG. 9 plotted with the data unit timers $T_2(1)$ and $T_2(2)$ as parameter becomes as shown in FIG. 9.

For a certain frequency, for instance, represented by a vertical line in FIG. 9, when voltage goes up the parameter changes from $T_2(1)$ to $T_2(2)$ and so on, and the HALT region decreases; and at extremity, the HALT region vanishes. For a certain rectified and smoothed DC voltage from the rectifier smoother 1, a maximum voltage to be impressed on the electric motor 3 is determined by this condition. Accordingly, even though the frequency is increased further from that condition, the voltage to be impressed on the electric motor 3 does not change further. The above-mentioned situation is elucidated with reference to FIG. 10(a) and FIG. 10(b).

As shown in FIG. 10(a), a carrier period $T_0(3)$ is equally divided by an integer number K thereby defining the data unit timer $T_2(1) = 1/K \cdot T_0(3)$, without retaining the HALT region at all. That is, the relation $T_0(3) = K \times T_2(1)$ holds. Then, provided that the frequency f is raised so as to have a shorter carrier period $T_0(4)$ shown in FIG. 10(b) than a previous carrier period $T_0(3)$, the data unit timer $T_2(3)$ is given by an equation $T_0(4) = K \times T_2(3)$. At this frequency change, ratios of data region period against carrier period $T_0$ are kept constant, and accordingly the voltage obtained from the both cases are equal each other as shown by FIG. 11.

Nextly, relation between the inverter output and load is elucidated. When the load is a resistance load, the inverter output is proportional to square of voltage. On the other hand, with respect to a compressor of an air conditioner, amount of work is proportional to exhaustion volume of refrigerant from cylinders of the compressor, and accordingly, the exhaustion volume is proportional to revolution number of the electric motor. Accordingly, it is preferable that frequency f and the output voltage should have a predetermined proportional relationship.

On the other hand, actual electric motor for the compressor shows effect of iron loss and copper loss, etc., and therefore, in low frequency range it is necessary that its driving voltage should be increased in order to compensate the above-mentioned iron loss, copper loss, etc. That is, boost function is necessary.

In the prior art apparatus, the boosted curve was realized by adding corrections by obtaining the carrier period $T_0$ and data unit timer $T_2$ by analog timer circuits, and the carrier frequency is set by means of the carrier period $T_0$, and the compensation is added to the unit timer $T_2$ responding to the set value of the carrier period $T_0$. Greatest advantage of the HALT system is that by only changing the carrier period $T_0$ and data unit timer $T_2$, the PWM algorithm can be obtained for any frequency regions by providing only one period of algorithm generation pattern.

The above-mentioned prior art apparatus has the advantage that, when circuit to produce the carrier period $T_0$ and the data unit timer $T_2$ are realized by analog timer circuit, minute variation of the timer value can be made by handling circuit component of the external circuit, and the carrier period $T_0$ and the data unit timer $T_2$ can be adjusted independently each other. But the prior art has a problem that when frequencies to be used widely distribute and when close simulation to the sinusoidal wave is intended, there is a necessity that the carrier N and the integer K (number of data) should be switched. That is, in a low frequency range where resolution of the sinusoidal wave becomes rough and simulation of the sinusoidal wave becomes difficult, it is necessary that the carrier N and the integer K must be selected large. And on the other hand, when the carrier N and the integer K are large in a range of high frequency of f, switching speed of the transistors $Tr_1$ through $Tr_6$ becomes a great problem. That is, due to limit of the switching speed of the transistors $Tr_1$ through $Tr_6$, OFF-times of the transistors occupy high ratio in the operation, and therefore output voltage becomes low. Accordingly, the carrier N and the integer K must be limited to a reasonable small number.

In the prior art analog timer system, though PWM generation data itself relating to change of the carrier N and data number K can be made by external data area such as ROM or the like, smooth switchings between two kinds or more analog timers is difficult in view of transiential phenomena. For instance, in case that such switching is made by changing the carrier period $T_0$ and data unit timer $T_2$ with even a small difference, target frequency or target voltage happens suddenly to change even at a short instance, and therefore the compressor may have an overcurrent or locking or at some instance, the power transistors will be damaged.

Furthermore, though above-mentioned prior art system has boosting function at the low frequency range as shown in FIG. 12, when the voltage of the power source is lowered the output voltage induced by the PWM also is lowered, thereby lowering torque of the compressor and increasing current of the motor, leading to further inducing of breakdown and efficiency drop of the compressor motor.

SUMMARY OF THE INVENTION

The purpose of the present invention is to provide an inverter-drive controlling apparatus wherein the shortcoming of the prior art is eliminated and more closely simulated sinusoidal wave as integral of PWM waves is obtainable.

The above-mentioned purpose is achieved by providing the carrier period $T_0$ and the data unit timer $T_2$ as each other independent digital values, by controlling the carrier period $T_0$ and the data unit timer $T_2$ to determine the frequency and the voltage, and by providing compensations in a manner to achieve a predetermined V/f output characteristic with respect to fluctuation of power source voltage; so that by utilizing the same, i.e., a single PWM data pattern, wide range of voltage-frequency characteristics are efficiently realizable.

The inverter-drive controlling apparatus of sinusoidal wave of unequal width PWM type, wherein PWM signal comprises a data region and a HALT region in each of carrier period which is made by equally dividing the half period of a sinusoidal wave to be simulated by a predetermined integer called a carrier, the apparatus comprises:

first timer means for digitally producing the carrier period responding to desired rotation number of a motor to drive, second timer means for operating a routine containing plural steps for producing voltage data by using digital means which is independent from the first timer means, voltage fluctuation detecting means for detecting fluctuation of power source voltage, a memory storing data for one or half period of waveform generate by an inverter, storing HALT data to stop impressing of voltage to the motor during HALT regions where the no voltage data exists, and storing compensated data of the second timer compensated by output from the voltage fluctuation detecting means, and inverter output voltage compensation means for compensating output voltage of the inverter basing on the compensation data of the second timer, wherein initial data access in each carrier period is made by the first timer means and the second timer means and next data access in each carrier period is made by the second timer means, thereby making a compensation of output voltage of the inverter based on the voltage fluctuation.

Furthermore, the above-mentioned system is realized by utilizing two micro-computers, wherein a first microcomputer produces the data of carrier period $T_0$ and the data of the unit timer $T_2$, responding to various utilities, and the second micro-computer produces sinusoidal PWM signal by receiving the output data signals from the first microcomputer.

Furthermore, when the carrier period $T_0$ and the data unit timer $T_2$ are controlled by using the same reference frequency, controllings of high accuracies for frequency and voltage of output current through elimination of errors between them.

BRIEF DESCRIPTION OF THE DRAWING

FIG. 4 is the graph illustrating the carrier of the inverter system of FIG. 1.

FIG. 5(a) and FIG. 5(b) are graphs illustrating voltages applied to the electric motor 3 of the inverter of FIG. 1.

FIG. 9 is the graph showing voltage-frequency relation of the apparatus of FIG. 1 taking the unit timer $T_2$ as parameter.

FIG. 10(a) and FIG. 10(b) are the time charts showing data regions in the carrier period $T_0$ of the prior art apparatus of FIG. 1.

FIG. 26 is a flow chart showing flow of processing of the embodiment of FIG. 25.

DESCRIPTION OF THE PREFERRED EMBODIMENT

Hereafter, one preferred embodiment of an inverter-drive controlling apparatus in accordance with the present invention is described with reference to FIG. 13 and thereafter.

Figure 13:
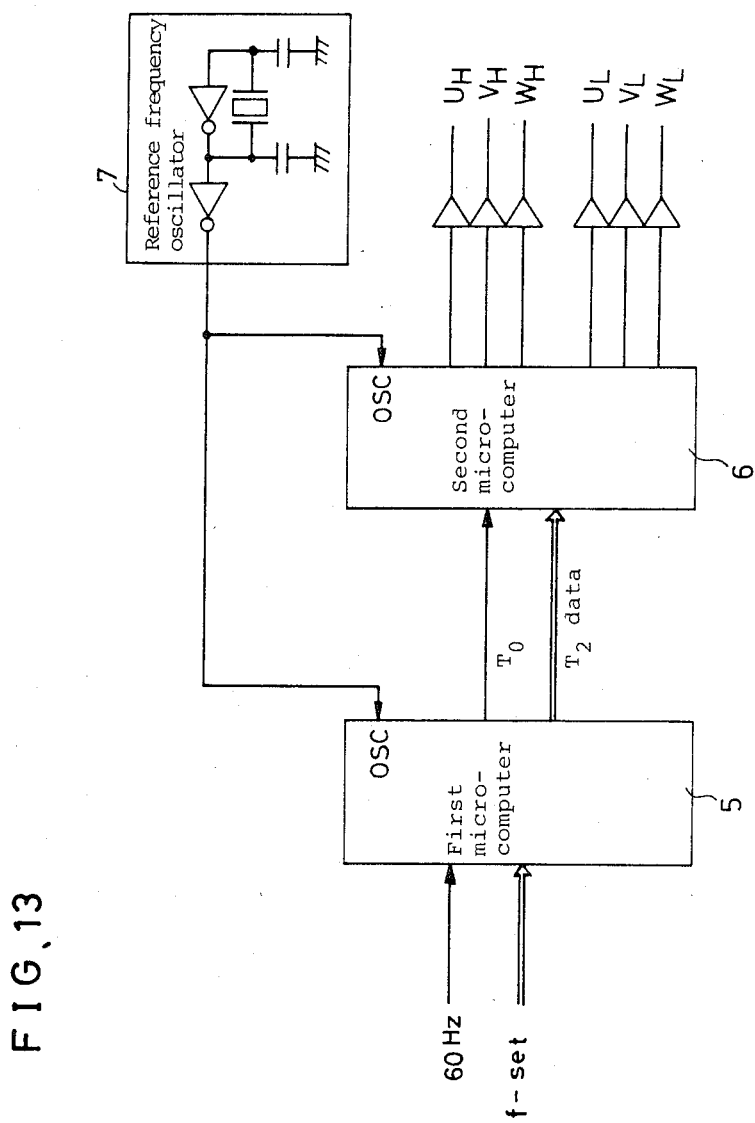
FIG. 13 is a block diagram of a part of an inverter-drive controlling apparatus, which is an essential part of an embodiment of the present invention.
Figure 21:
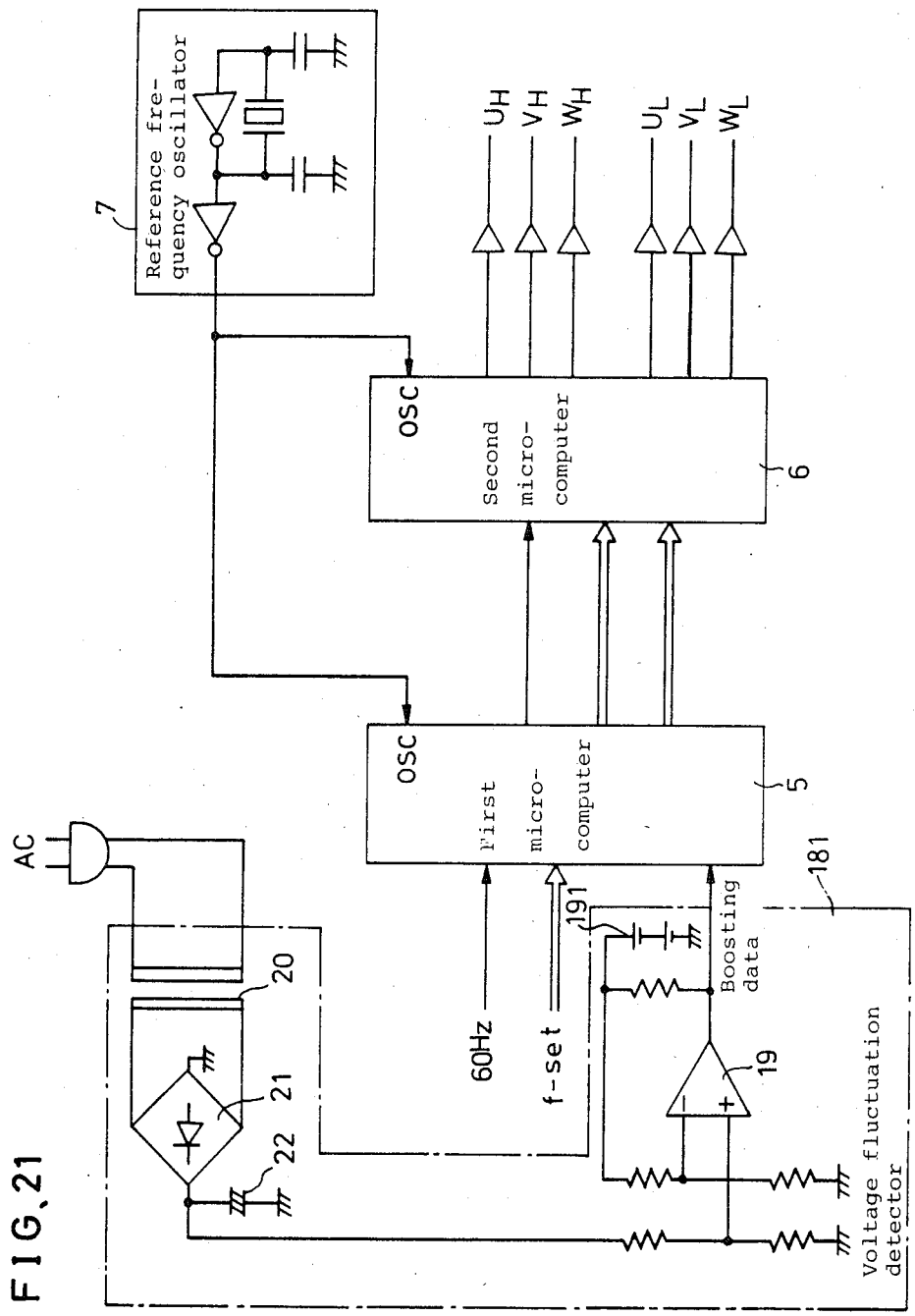
FIG. 21 is a block diagram of a preferred embodiment of an inverter drive controlling apparatus in accordance with the present invention.
Figure 22:
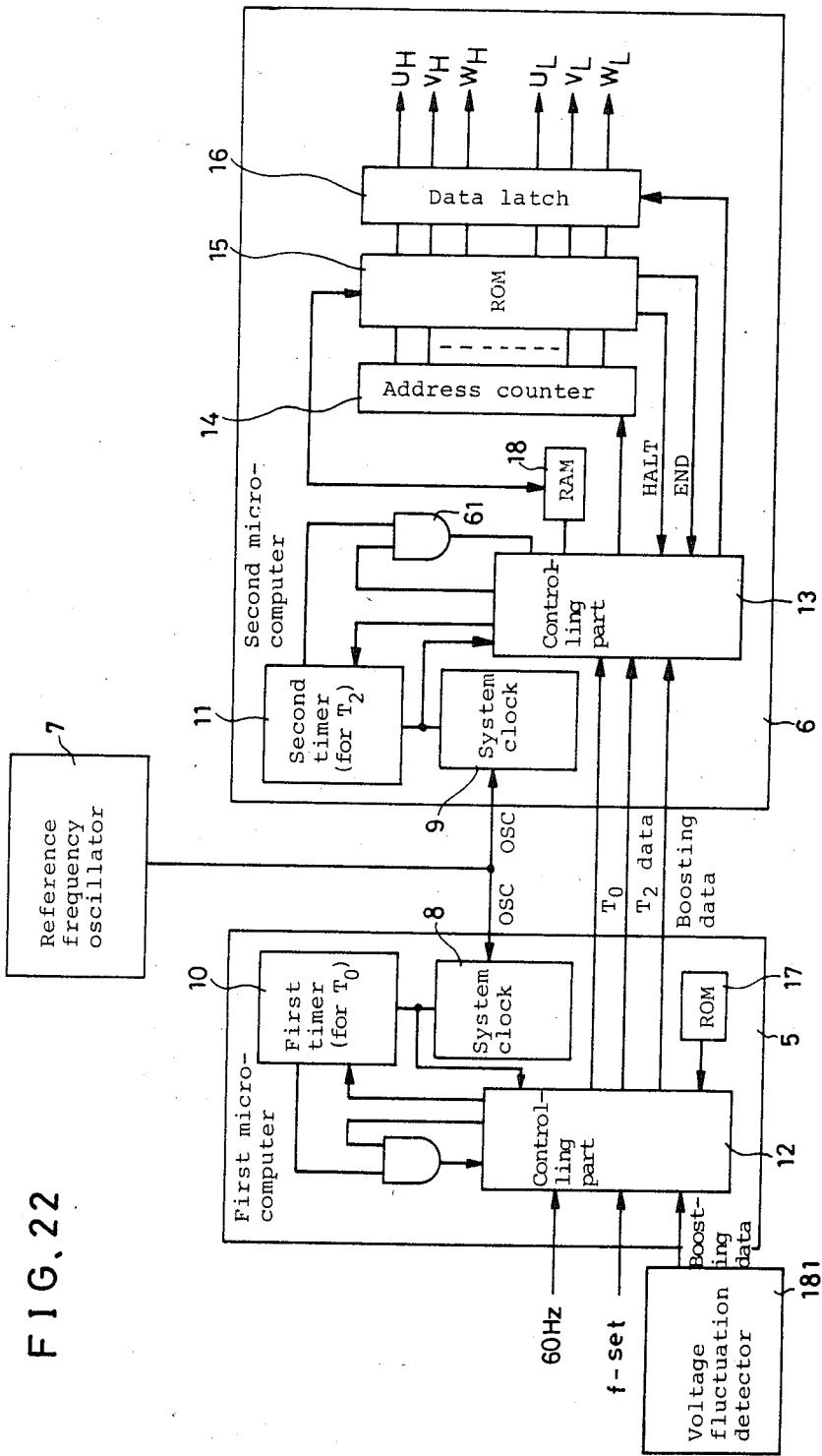
FIG. 22 is a more detailed circuit block diagram of the preferred embodiment of FIG. 21.

First, FIG. 13 shows a central part of a preferred embodiment, full configuration of which is shown in FIG. 21 and FIG. 22. Since the invention has a complexity of configuration and operation, the central part shown in FIG. 13 and FIG. 14 are described first.

Figure 1:
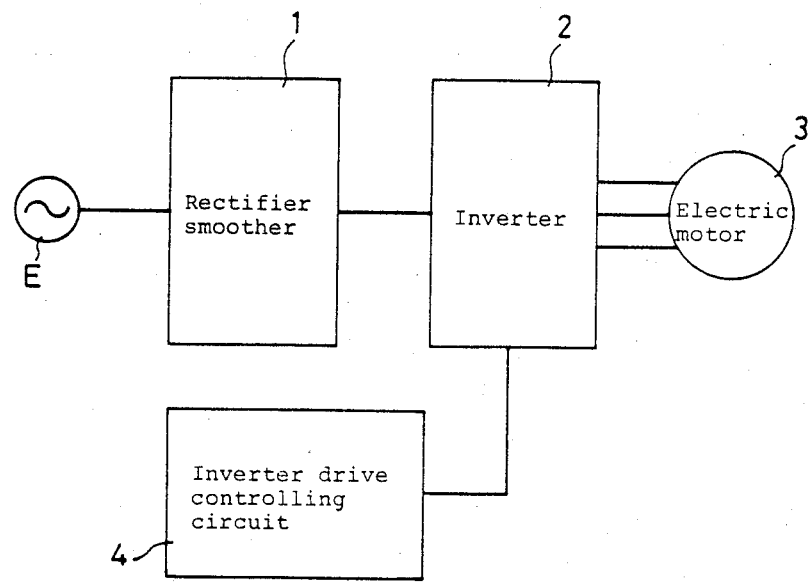
FIG. 1 is the block diagram of the general prior art inverter system.
Figure 2:
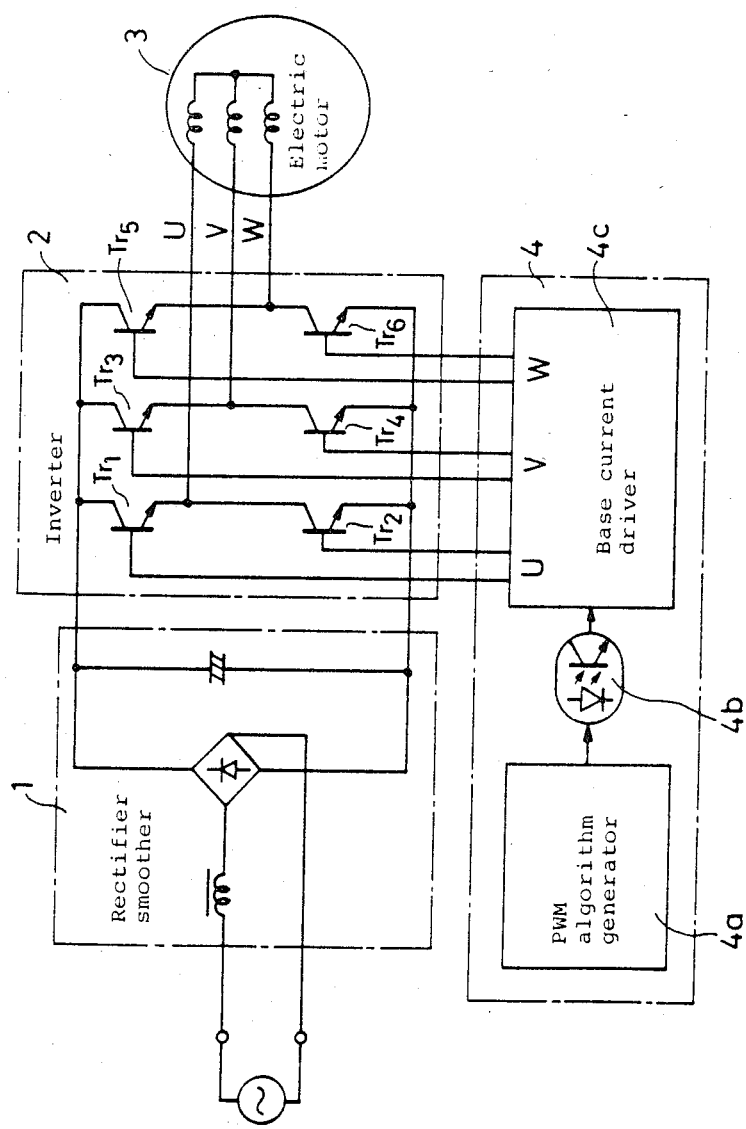
FIG. 2 is the more detailed block diagram of the prior art apparatus of FIG. 1.
Figure 3:
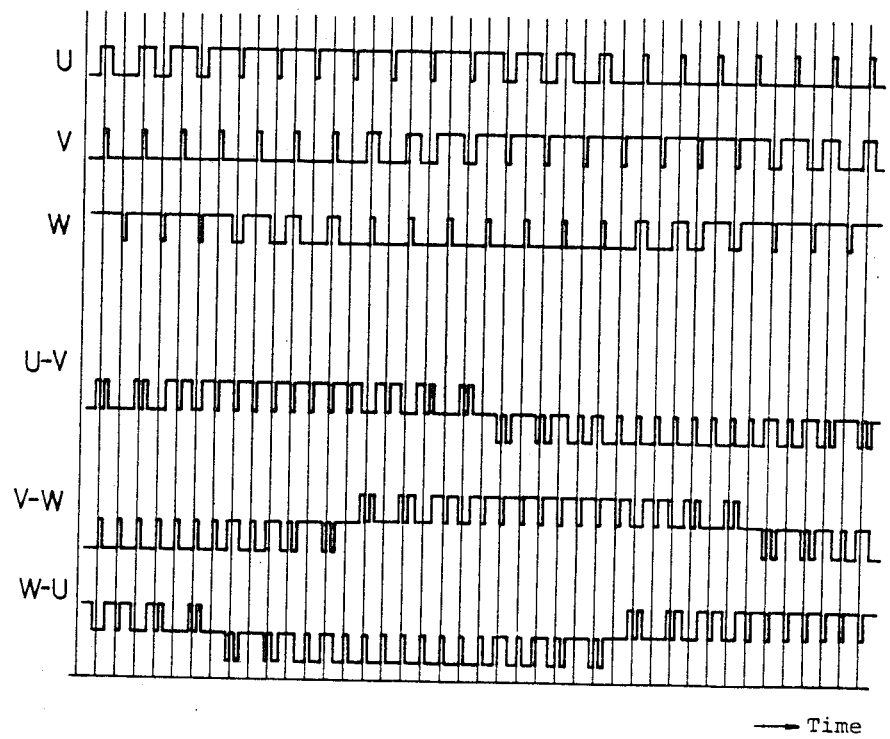
FIG. 3 is the time chart showing voltage waveforms to be applied the electric motor 3 of the prior art apparatus of FIG. 1.
Figure 6A:
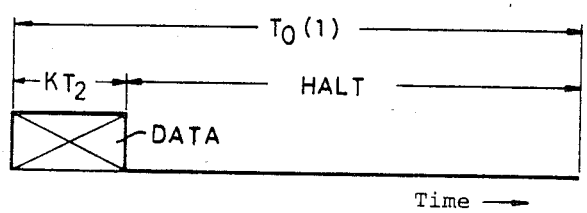
FIG. 6(a) and FIG. 6(b) are time charts illustrating HALT period and the period in the carrier period $T_0$.
Figure 6B:
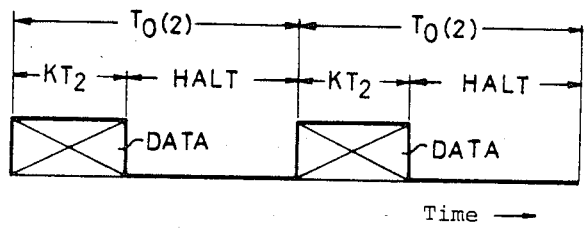
Figure 7:
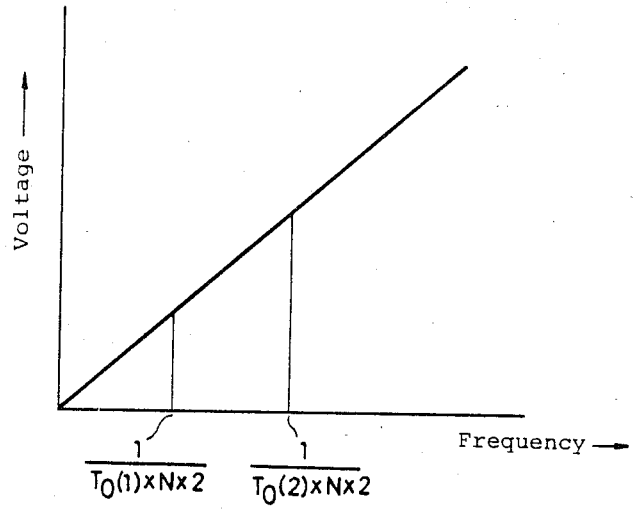
FIG. 7 the graph showing voltage-frequency relation of the inverter of FIG. 1.
Figure 14:
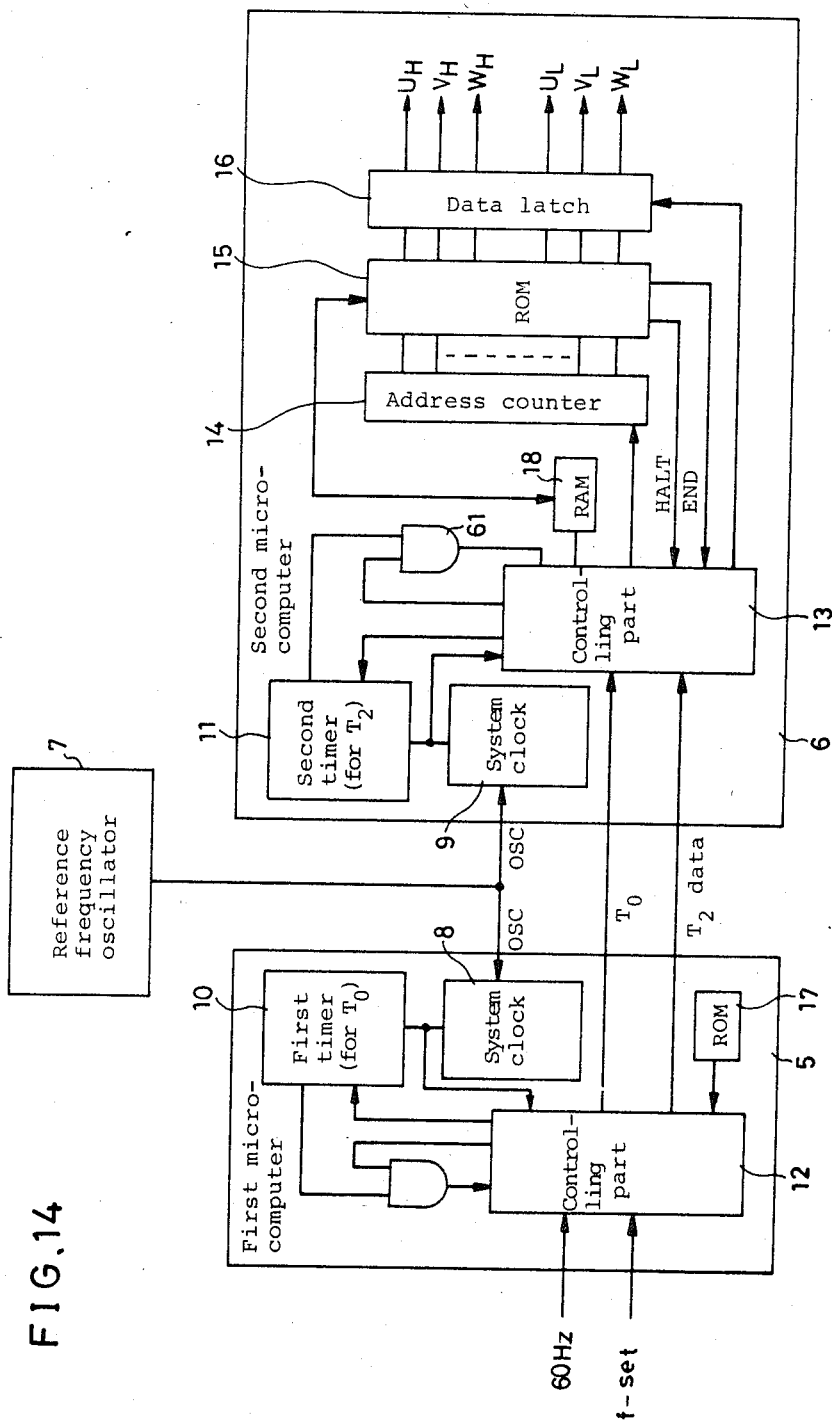
FIG. 14 is a more detailed block diagram of the apparatus shown in FIG. 13.

The central part shown in FIG. 13 and FIG. 14 has a first micro-computer 5 and a second mico-computer 6, and a reference frequency oscillator 7. The output signal of the reference frequency oscillator 7 is given to each input terminals OSC of the micro-computer 5 and 6. The first micro-computer 5 receives 60 Hz pulse signal produced from a commercial power source and an f-set signal which is a command signal to give a selected rotation speed of an electric motor as a load. The first micro-computer 5 issues a signal of carrier period $T_0$ and a data for data unit timer $T_2$ which are to be made in the second micro-computer. The second micro-computer 6 processes the input signals and issues PWM signals which is to be given to the bases of the power transistors $Tr_1, Tr_2, Tr_3, Tr_4, Tr_5$ and $Tr_6$ shown in the circuit of the inverter 2 of FIG. 2. More detailed configuration of the apparatus of FIG. 13 is shown in the circuit block diagram of FIG. 14. The input signal of the commercial AC power source current is used as a timer to produce frequency change rate for changing frequency of the output signal of the second micro-computer to the inverter 2 towards a target frequency given by f-set signal to the first micro-computer 5. The signal from the reference frequency oscillator 7 is divided by system clock circuit 8 and 9, respectively, of the first micro-computer 5 and the second micro-computer 6; and these signals are given to a first timer 10 for counting $T_0$ and a controlling part 12 in the first micro-computer 5 and to a second timer 11 for counting the data unit timer $T_2$ and a controlling part 13 in the second micro-computer 6, respectively. The second timer 11 is for operating a routine containing plural steps for producing voltage data. The controlling part 12 in the first micro-computer 5 and the controlling part 13 in the second micro-computer 6, respectively, carry out processings by executing programs given from a ROM 17 in the first micro-computer 5 and a RAM 18 in the second micro-computer 6, respectively. The carrier period $T_0$ and the data unit timer $T_2$ are given from the controlling part 12 of the first microcomputer 5 to the controlling part 13 of the second microcomputer 6. The ROM 17 stores frequency dividing data for producing carrier period $T_0$ and the data unit timer $T_2$ for many target frequencies given as the f-set input signal. That is, the controlling part 12 reads out necessary carrier period $T_0$ and the data unit timer $T_2$ corresponding to the inputted f-set signal value from the ROM 17, and the read out data $T_0$ and $T_2$ are given to the controlling part 13 of the second micro-computer 6. And the data unit timer $T_2$ is further set in the second timer 11. On the other hand, the carrier period signal $T_0$ together with the data unit timer $T_2$ set in the second timer 11 are inputted to the controlling part 13 by interruption processing, and further through an address counter 14 access to a ROM 15, which stores the PWM data. The data read out from the ROM 15 are given to a data latch 16, which gives length of retention time by commands from the control part 13. Thus, the data latch 16 issues six parallel output signal $U_H$, $V_H$, $W_H$, $U_L$, $V_L$ and $W_L$ to be given to the basis of six transistors of a three phase inverter 2 of FIG. 2.

Functions necessary for controlling of the system, for instance, processing of freezing, communication with a micro-computer in an indoor unit of a separate units type air conditioner, operation of a four sides valve, operation of a fan motor, controlling of current, a defrosting control, or the like are carried out by the first control part 12 in the first micro-computer 5.

Next, outline of digital processing is described with reference to FIG. 15 and FIG. 16.

Figure 12:
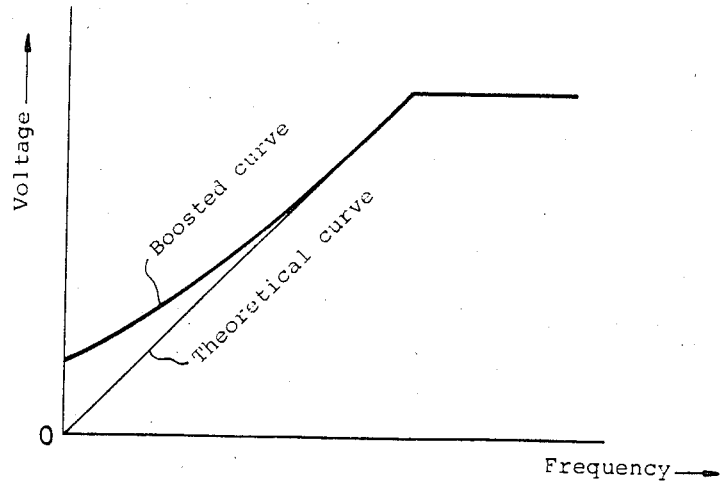
FIG. 12 is the graph showing voltage-frequency required for the low frequency region operation of the prior art of FIG. 1.
Figure 15:
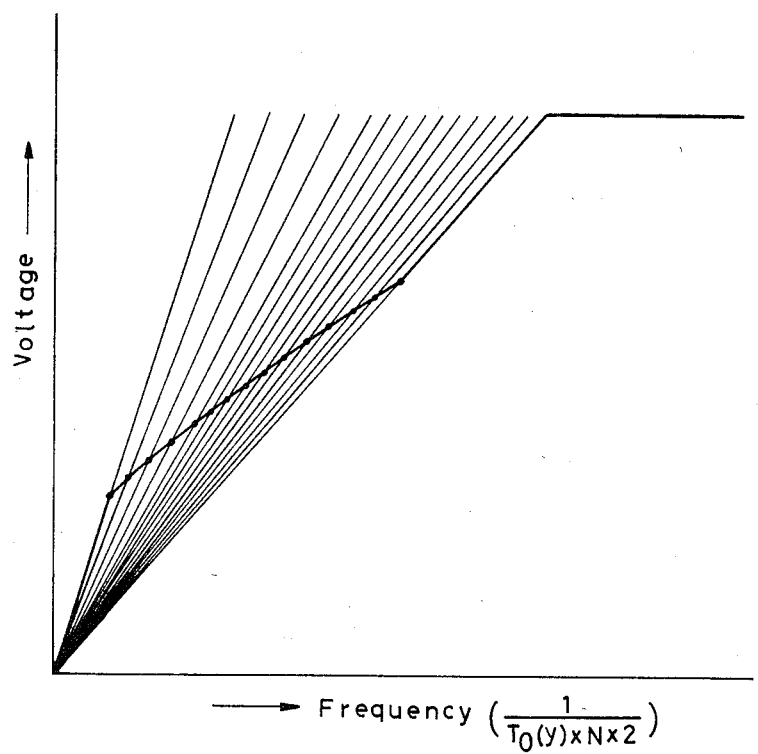
FIG. 15 is a graph showing voltage-frequency relation of the apparatus of FIG. 13 and FIG. 14.

FIG. 15 is a graph of voltage-frequency characteristic diagram illustrating boosting of the low frequency range in the circuit of FIG. 12 and FIG. 13.

As has been elucidated with respect to the prior art, the voltage-frequency gradient is determined by the data unit timer $T_2$, and the frequency f is determined by the carrier period $T_0$; and therefore by plotting crossing points of the boosted voltage curves for respective frequencies and oblique lines of the parameter of the data unit timer $T_2(x)$; data can be issued as combinations of $(T_0, T_2)$.

Figure 16:
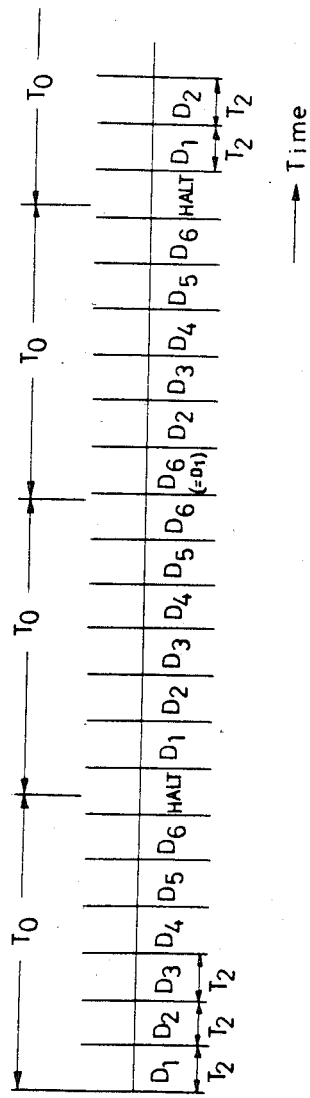
FIG. 16 is a schematic timing chart showing data regions in case digital processings are dropted.

FIG. 16 illustrates digital processing when HALT region is short. Here, it is provided that data number K is 6 and the data are now named $D_1$, $D_2$, $D_3$, $D_4$, $D_5$ and $D_6$. Data unit timer is named $T_2$ and the carrier period is named $T_0$.

Figure 8A:
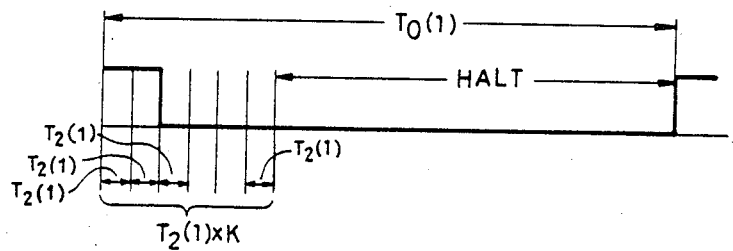
FIG. 8(a) and FIG. 8(b) are time charts showing data timer $T_2$ and HALT period in the carrier period $T_0(1)$ in the prior art apparatus of FIG. 1.
Figure 8B:
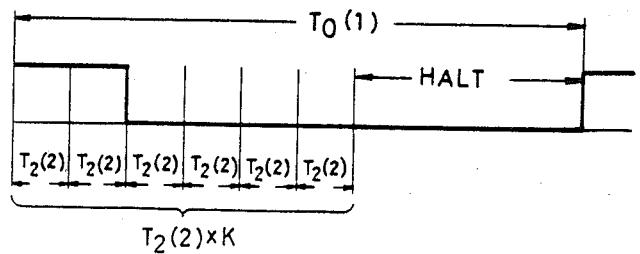
Figure 11:
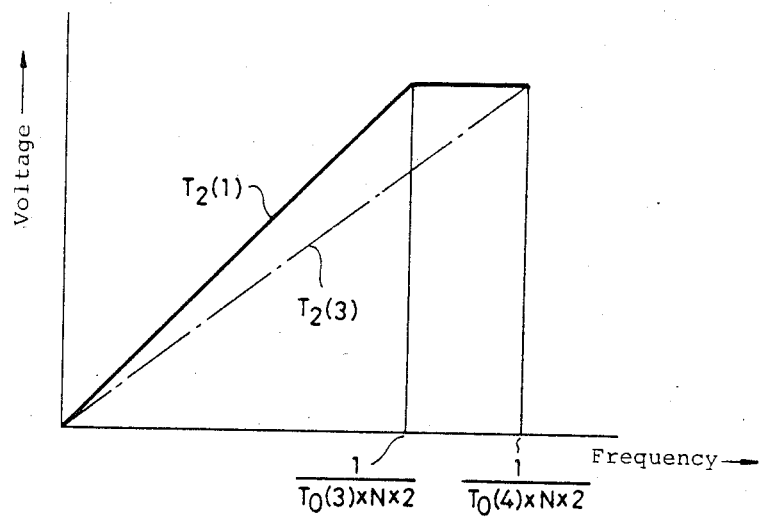
FIG. 11 is the graph showing voltage-frequency relation of the prior art apparatus of FIG. 1.

(i) In case HALT period is longer than carrier period $T_0$, like the case as shown in FIG. 8, after issuing HALT another signal of carrier period $T_0$ is waited for, and the next data $D_1$ is issued in synchronism with the next carrier period $T_0$.

(ii) Nextly, in the case when the next carrier period $T_0$ comes when the HALT time period is shorter than the data unit timer $T_2$, the HALT is issued only for the data unit timer $T_2$ as shown at the boundary between the first carrier period $T_0$ and the second carrier period in FIG. 16, and thereafter the data $D_1$ through $D_6$ are issued subsequently. At this time, output time periods for issuing the data $D_1$ through $D_6$ each are the data unit timers $T_2$ as such.

(iii) Nextly, in the case when the end of the carrier period $T_0$ comes during outputting of the data 6, the next HALT is not issued but the data $D_6$ is continued to be issued for the remaining data unit timer $T_2$. During this time, address of PWM pattern data is changed by adding 2 (i.e., +2) for the next time. That is, in the next carrier period $T_0$ the data $D_1$ is omitted, that is the $D_2$ is accessed immediately after the doubled $D_6$, as shown in a second to third carrier period boundary.

Here, the PWM pattern data is preliminarily determined in a manner that the data $D_6$ and the next data $D_1$ which are adjacent with the HALT inbetween are to be the same logic value. By so designing, the secondly output data $D_6$, for instance, being the same as that of the next data $D_1$, the sequence of the data becomes as if the HALT region is distinguished and the data are issued in continuity.

When the frequency further increases, the HALT period is equal to the unit timer $T_2$, but probability of appearance of HALT itself decreases in total period and output voltage increases.

Finally, when the voltage reaches the upper limit, the HALT period completely disappears thereby holding $T_0=6T_2$. This is the case which has been elucidated with reference to FIG. 10(a) and FIG. 10(b).

In order to further raise the frequency, carrier period $T_0$ is shortened by keeping the above-mentioned relation of $T_0=6T_2$.

Figure 17:
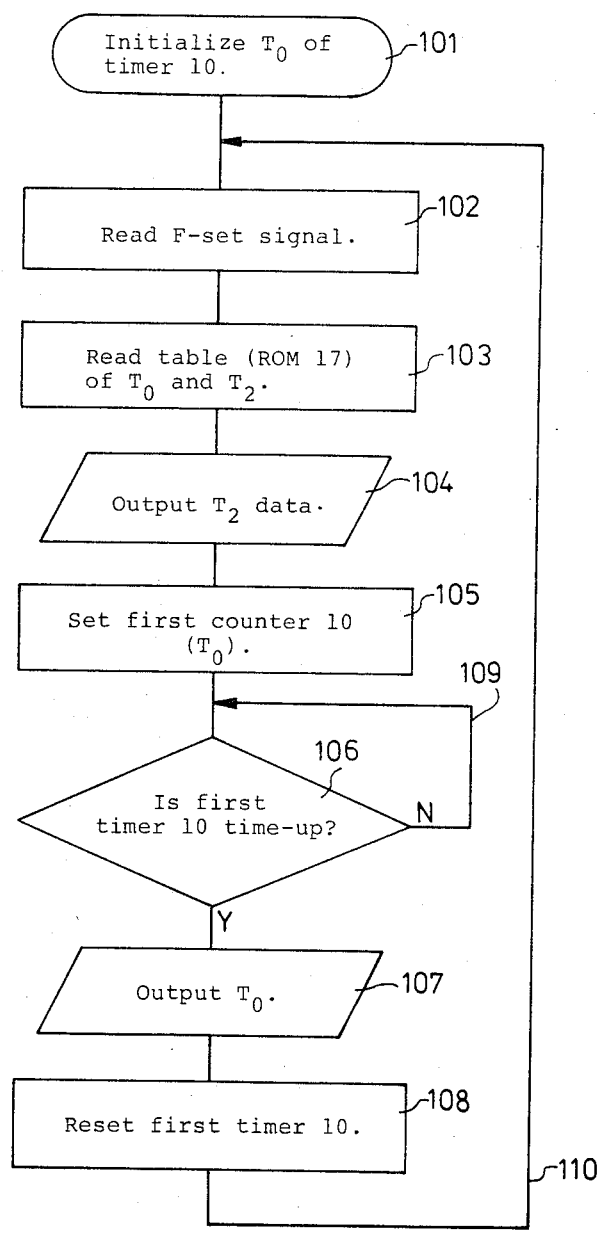
FIG. 17 is a flow chart showing a flow of processing in a first micro-computer 5 of the apparatus of FIG. 13 and FIG. 14.

As shown in FIG. 17, when a target signal f-set is inputted to the first micro-computer 5, the controlling part 12 reads from the ROM 17, a $T_0$ data and $T_2$ data as shown by a block 103 of FIG. 17. Then, the read out $T_2$ data is given to the second micro-computer 6, and the $T_0$ timer is set in the first counter 10 as shown in the block 105 of FIG. 17. And, at the same time the $T_0$ data is given to the second micro-computer 6.

Figure 18:
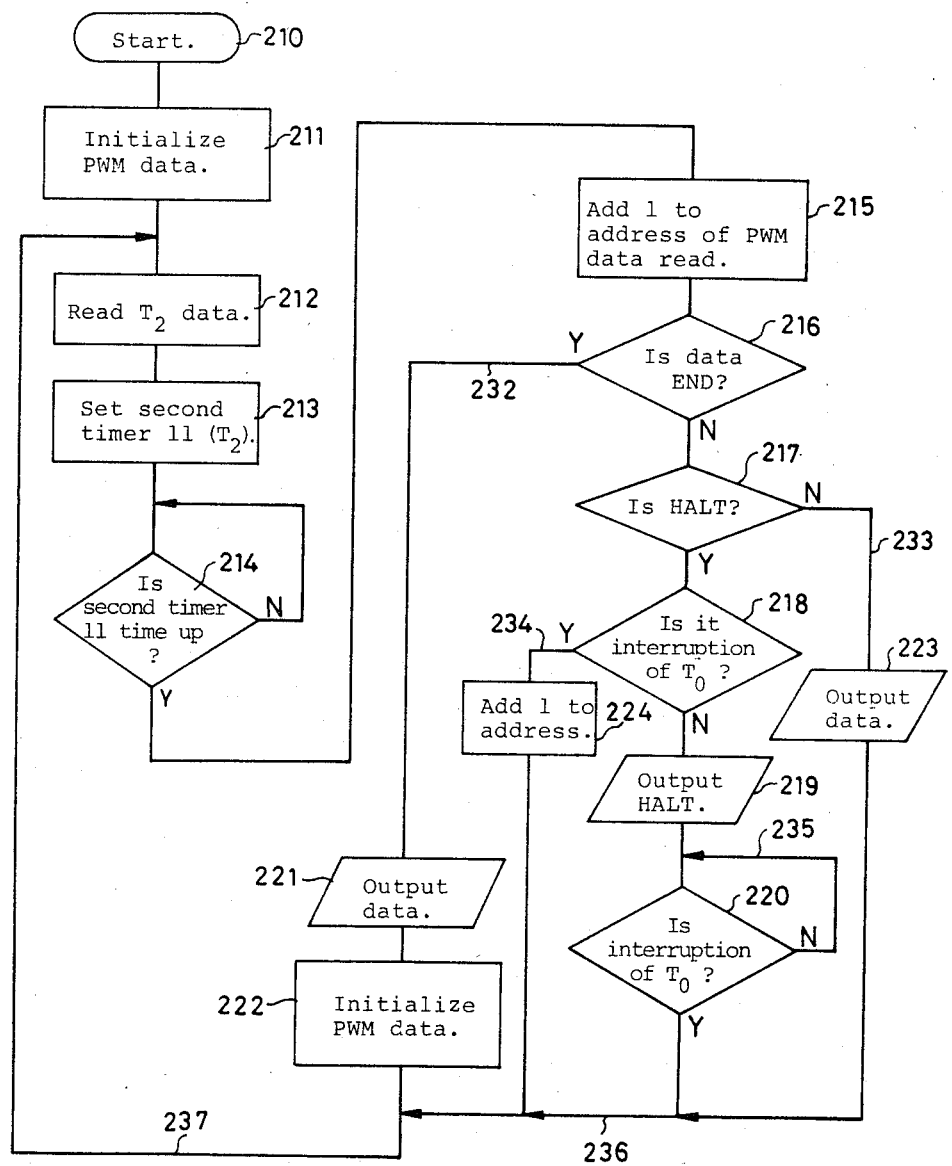
FIG. 18 is a flow chart showing a flow of processing in a second micro-computer 6 of the apparatus of FIG. 13 and FIG. 14.
Figure 19:
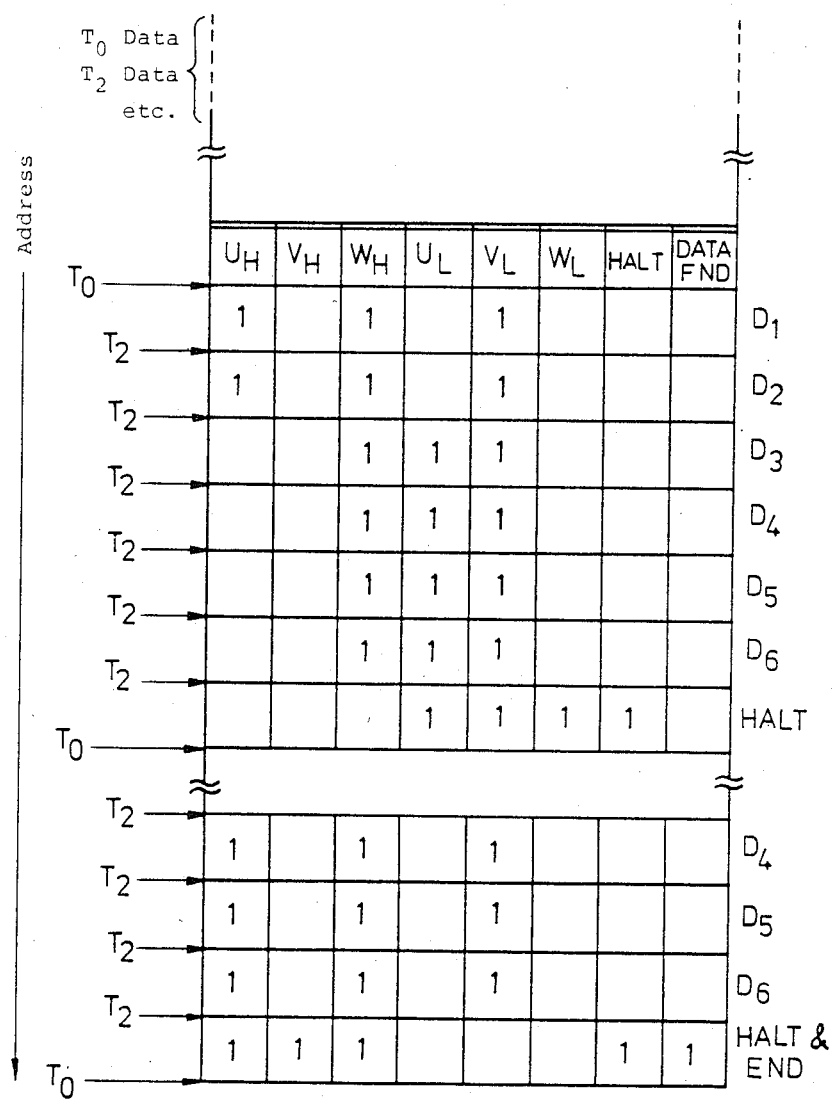
FIG. 19 is a diagram showing PWM data areas in a ROM in the apparatus of FIG. 13 and FIG. 14.

Then, in the second micro-computer 6 the PWM data is initialized first as shown by the block 211 of FIG. 18, and reads the $T_2$ data from the micro-computer 5 as shown by the block 212, and the second timer 11 is set with the $T_2$ data as shown by a block 212 of FIG. 18, and the $T_2$ data is set in the second timer 11 as shown by a block 213, and a time up of the second timer 11 is waited for as shown by a block 214, and when the time is up the process goes to the next program the PWM data are read out from the ROM 15 as shown by a block 215 of FIG. 18, and a data END is decided. Since the data is not END at first, HALT is then decided as shown in a block 217 of FIG. 18. Since the data is a first one, the decision becomes N, and therefore a data is output as shown by a block 223, and these are repeated through paths 236 and 237. When the data are issued until $d_6$ of FIG. 16, then the decision of HALT shown by the block 217 becomes Y, and at that time, interruption signal, i.e., a carrier period $T_0$ given from the first microcomputer 5 is decided as shown by a block 218. When the carrier period $T_0$ is not yet inputted at that time, a HALT is outputted as shown by a block 219, and the processes are repeated until an interruption of the carrier period $T_0$ comes. When a carrier period $T_0$ is received as an interruption input, the process returns through routes 236 and 237 to the initial part. And then, a next data $d_1$ is issued.

When the HALT is decided Y, and interruption input of the carrier period $T_0$ is Y at that time, address of the PWM data is added by 1 as shown by a block 224, and the process goes back to the initial stage in order to the next data D1.

For the last data of one period, the decision of the data END becomes Y, and the last data is issued as shown by a block 221, and the PWM data are initialized as shown by a block 222 before entering a next period, and the process returns to the initial state by the route 236. Thus, the initial data access in each carrier period is made by the first timer 10 and the second timer 11, and the next data access in each carrier period is made by the second timer 11.

Data for one period are issued in sequence as above, and by means of the carrier period $T_0$ and data unit timer $T_2$, the frequency f and the voltage V are decided thereby to produce a desired PWM Pattern.

In case the PWM data, carrier period $T_0$ and data unit timer $T_2$ do not make changes, the same data as described above are repeatedly issued. When the carrier period $T_0$ and data unit timer $T_2$ are changed, the PWM pattern changes its frequency and voltage while retaining the pattern of the AC signal. When a first address number of the data address is changed, different PWM pattern having different carrier N and data number K is issued. As has been described, by providing plural PWM data patterns, for instance, providing a PWM data pattern with a large a number of K for low frequency operation, sinusoidal waves of high resolution can be realized. The first address number of the data address, carrier period $T_0$ and data unit timer $T_2$ are preliminarily decided by the first micro-computer 5 in order to give best operation mode, for instance, as an air conditioner with respect to efficiency, current, temperature, and the like.

By the above-mentioned configuration, of the essential part of the inverter-drive controlling apparatus unequal width sinusoidal wave PWM algorithm is generated to assure smooth rotation of the compressor.

The preferred embodiment of the present invention further comprises means to compensate undesirable influence of power source voltage fluctuation which detects fluctuation of the power source voltage and to make a constant voltage frequency characteristic.

Before describing the detail of the preferred embodiment, the background of the necessity of the abovementioned means is elucidated.

Figure 20:
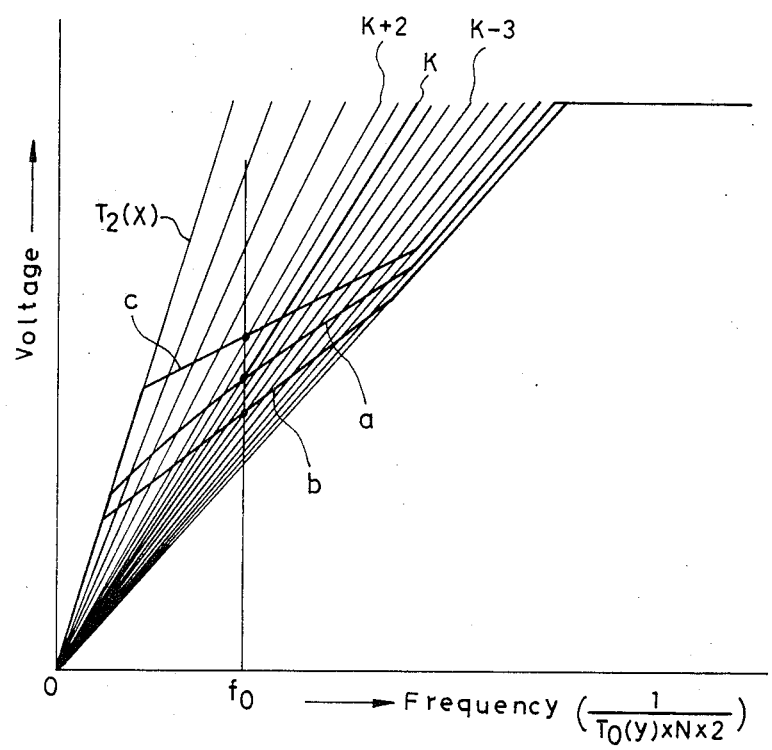
FIG. 20 is a graph showing voltage frequency characteristic of the apparatus shown in FIG. 13 and FIG. 14 for voltage fluctuations of the power source.

FIG. 20 is a graph showing voltage-frequency characteristic pattern. In the graph, a curve "a" shows a characteristic of the case where the voltage source is at a designed rating provided with the aforementioned boosting in the low frequency range. A curve "b" is for a case wherein the power source voltage is higher than the designed value, and a curve "c" is for the case where the power source voltage is lower than the designed value. Now, provided that a frequency is $f_0$, the data unit timer $T_2$ is K for the case of the curve "a". Then, operation of the curve "b" is realized by shifting the data unit timer $T_2$ to K−3, and the operation of the curve "c" is realized by shifting the data unit timer $T_2$ to K+2. That is to say, the gradations of the V/f curves are decided by the data unit timer $T_2$. In order to obtain a constant V/f for fluctuating power source voltage, the data unit timer $T_2$ must be made larger hence increasing the voltage V higher for a downward fluctuation of the power source voltage, and the data unit timer $T_2$ must be made smaller hence increasing the voltage V lower for a upward fluctuation of the power source voltage. In the above-mentioned shifting of the data unit timer $T_2$, the V/f characteristic of the output of the inverter can be kept substantially constant and equal to the case of the rated designed operation.

Also, the shifting of the data unit timer $T_2$ from K to K−3 or from K to K+2 can be made abruptly, it is better to adopt gradual shifting of from K to K−1, K−2 and to K−3, or shifting from K through K+1 and to K+2, in order to avoid undue loading on the compressor motor and also to achieve smoother controlling.

FIG. 21 is a full circuit diagram of a preferred embodiment with the meaning to retain the V/f characteristic constant. This circuit comprises a voltage fluctuation detector 181 connected by the output terminal to the first micro-computer 5. The voltage fluctuation detector has a comparator 19, connected by its one input terminal to a constant voltage source 191, and by its other input terminal to a rectifier circuit 21 with a smoothing capacitor 22, which rectifies a commercial AC power source current through a transformer 20. Therefore, when the voltage of the commercial AC power source becomes higher than a rated voltage, the comparator 19 issues an output signal to the first microcomputer 5. When number of the comparator 19 is increased, voltage fluctuation can be detected further in detail.

Other parts and components of the circuit of FIG. 21 is the same as that shown in the block diagram of FIG. 14 and described with reference to FIG. 14, and accordingly a redundant superposition of the description thereof are omitted.

FIG. 22 is a more detailed circuit diagram of the full circuit of the inverter-drive controlling apparatus of the circuit of FIG. 21. As shown in FIG. 22, output signal of the voltage fluctuation detector 181 is given to the controlling part 12, which issues boosting data for boosting the data unit timer $T_2$ is given to the second controlling part 13. That is to say, three signals, namely the carrier period $T_0$, the data unit timer $T_2$ and the boosting data are given from the first controlling part 12 to the second controlling part 13.

Figure 23:
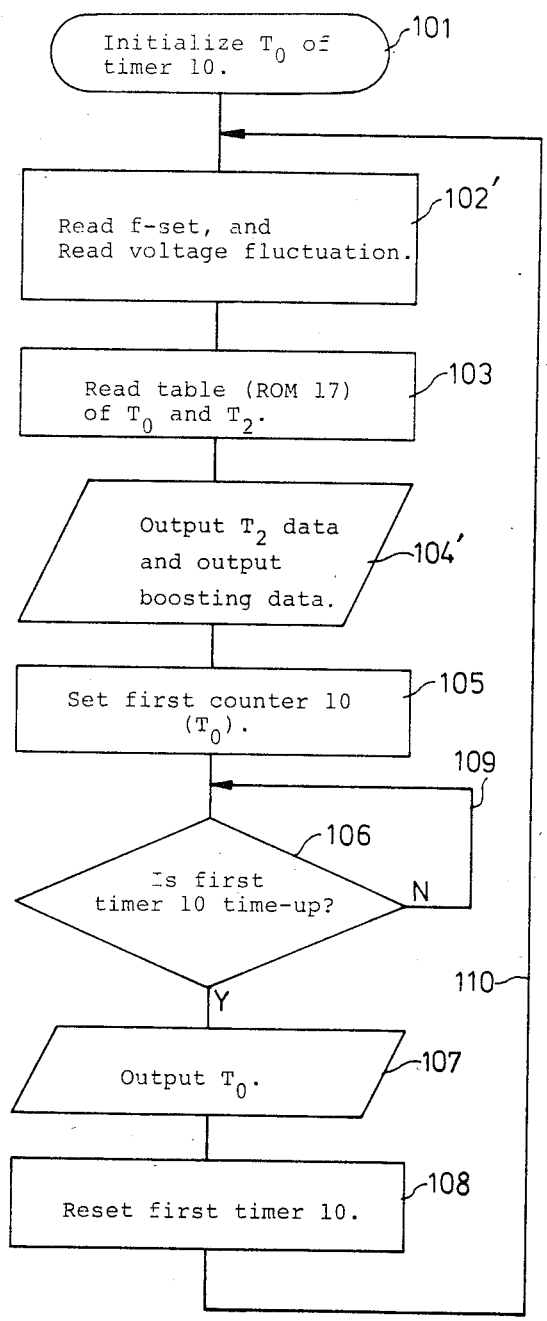
FIG. 23 is a flow chart showing flow of processing of carrier period $T_0$ in the preferred embodiment of FIG. 21 and FIG. 22.
Figure 24:
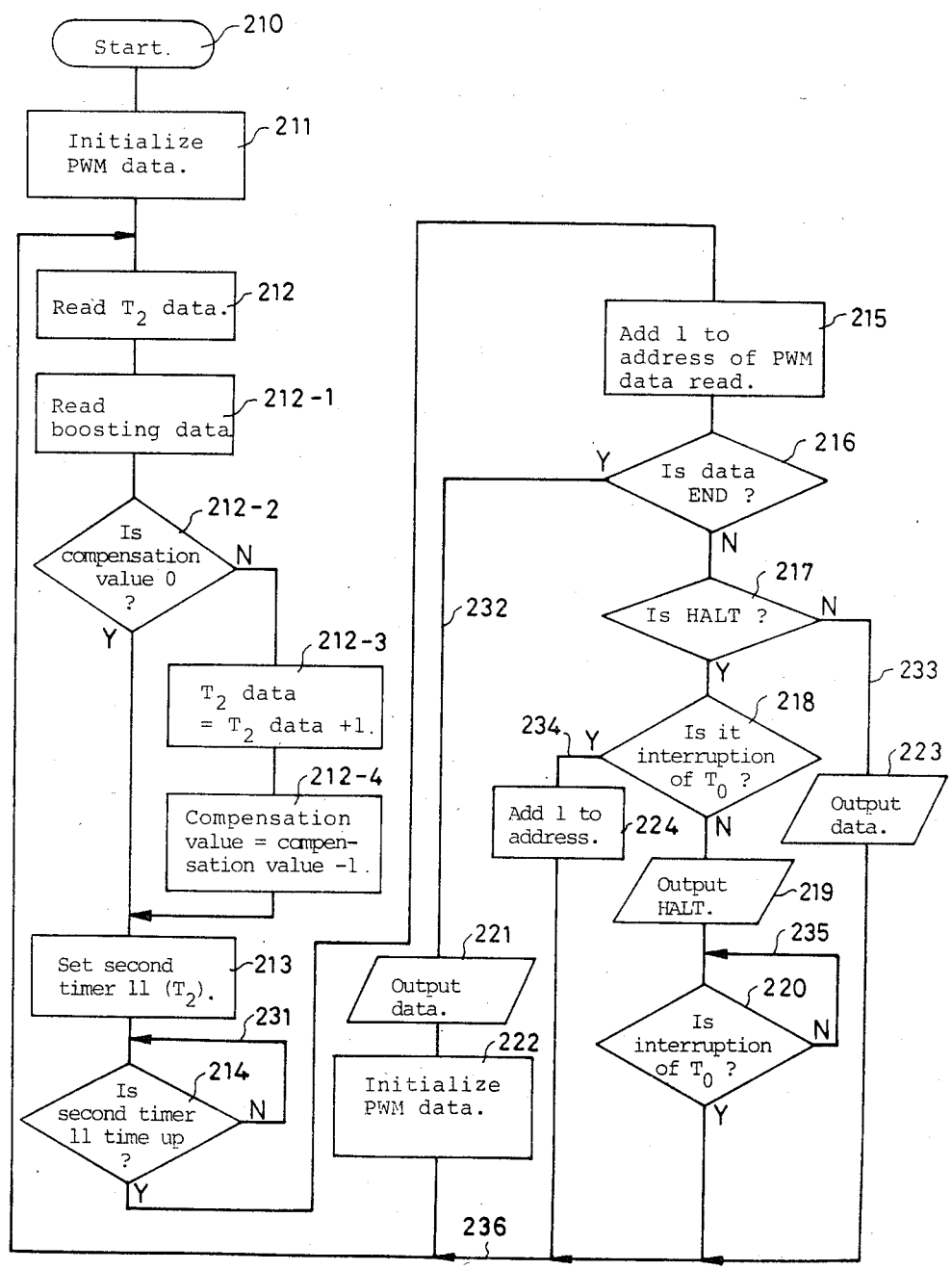
FIG. 24 is a low chart showing flow of processing of data unit timer $T_2$ in the preferred embodiment of FIG. 21 and FIG. 22.

The above-mentioned operation of the full circuit of FIG. 22 is elucidated with reference to a flow chart of FIG. 23, which is for the micro-computer 5 and is substantially identical to the flow chart of FIG. 17 except that in the second step 102' the f-set and the voltage fluctuation are read and that in the fourth step 104' the $T_2$ data and the boost data are outputted. That is to say, the fluctuation of the voltage of the AC power source is read by the voltage fluctuation detector 18 and the boosting data is produced based on the detection of the voltage fluctuation. And the boosting data are given to the second micro-computer 6 together with the $T_2$ data, and other steps are identical to those of FIG. 17. FIG. 24 is a flow chart of the micro-computer 6.

As shown in FIG. 24, in the second micro-computer 6, the steps of 212-1, 212-2, 212-3, 212-4, are inserted between the step of 212 and the step of 213, and remainder steps are identical to the flow of the flow chart, FIG. 18. As shown in FIG. 24, the PWM data are first initialized. And, together with the $T_2$ data given from the first microcomputer 5, the boosting data are read out by the second controlling part 13 and the data unit timer $T_2$ is set in the second timer 11 in the step 212-1. And, after time up of the data unit timer $T_2$ the program advances to the next step. That is to say, when the compensation value is zero, the data unit timer $T_2$ is set as it is, as shown by Y of the step 212-2; and when the data unit timer $T_2$ is to be compensated, then the $T_2$ data is changed to $T_2$ data $+1$ as shown by a step 212-3 at that time, by making the amending value $-1$, the change of the data unit timer $T_2$ for each loop of the amending step is 1, thereby the amending value is decreased by 1 every time. Accordingly, by changing to the final amending value, as shown by the step 212-4, the amending value becomes zero. Therefore, the data unit timer $T_2$ becomes $T_2$ data + boosting data. Thereby, the output voltage of the inverter is compensated based on the fluctuation. After setting of the second timer 11 in the step 211 and thereafter, the processing is identical to that of the flow chart of FIG. 18. And desired PWM waveform is generated.

In the above-mentioned way, the inverter-drive controlling apparatus of this embodiment can compensate the data unit timer $T_2$, thereby maintain the output voltage to a constant value irrespective of the fluctuation of commercial power source voltage.

Figure 25:
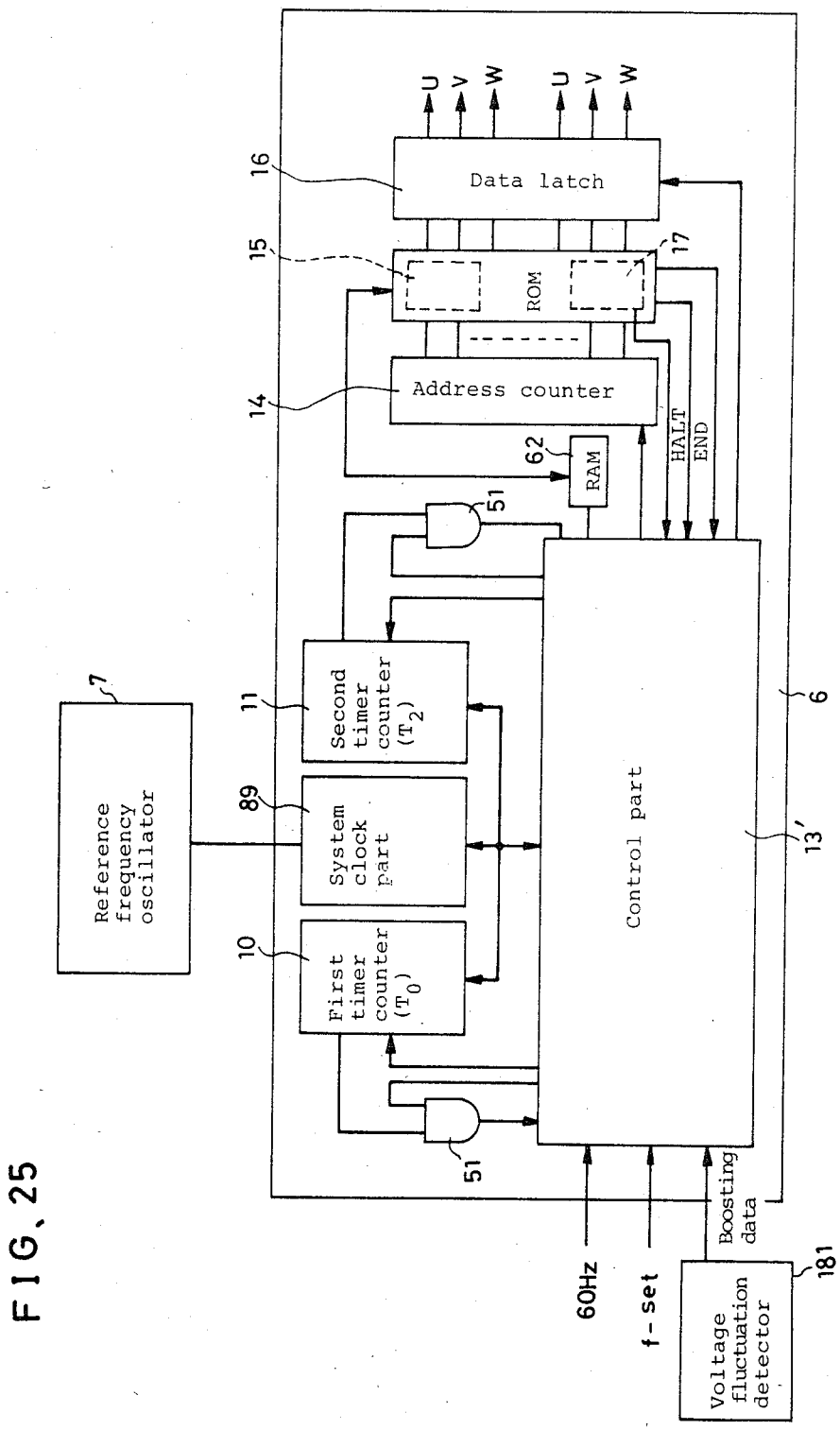
FIG. 25 is a circuit block diagram of another embodiment of an inverter-drive controlling apparatus in accordance with the present invention.

FIG. 25 shows still another embodiment. In this embodiment, wherein the first micro-computer and the second micro-computer are united into a single micro-computer 56 and therein a control part 13' is also united into a single circuit. Furthermore in the single micro-computer 56, a ROM 157 contains two parts 15 and 17, which serve the same functions as the ROM 15 and the ROM 17 of the circuit of FIG. 22. Also a system clock part 89 is united into a single part and serves in the same way as the system clock parts 8 and 9 of FIG. 22.

FIG. 26 shows a flow chart of the processing of the micro-computer 56 of FIG. 25. In this circuit, a single micro-computer 56 carries out a united processing as shown by the flow chart of FIG. 26.

What is claimed is:

1. An inverter-drive controlling apparatus of sinusoidal wave of unequal width PWM type, wherein PWM signal comprises a data region and a HALT region in each of carrier period which is made by equally dividing the half period of a sinusoidal wave to be simulated by a predetermined integer called a carrier, the apparatus comprising:
first timer means for digitally producing said carrier period responding to desired rotation number of a motor to drive,
second timer means for operating a routine containing plural steps for producing voltage data by using digital means which is independent from said first timer means,
voltage fluctuation detecting means for detecting fluctuation of power source voltage,
a memory storing data for one or half period of waveform generate by an inverter, storing HALT data to stop impressing of voltage to said motor during HALT regions where no said voltage data exists, and storing compensated data of said second timer compensated by output from said voltage fluctuation detecting means, and
inverter output voltage compensation means for compensating output voltage of said inverter basing on said compensation data of said second timer, wherein
initial data access in each carrier period is made by said first timer means and said second timer means and next data access in each carrier period is made by said second timer means, thereby making a compensation of output voltage of said inverter based on said voltage fluctuation.

2. An inverter-drive controlling apparatus in accordance with claim 1, wherein
said compensated data is made by step by step compensation of the data by 1 in each routine.

3. An inverter-drive controlling apparatus in accordance with claim 1, wherein
said memory stores at least two different regions storing plural set of data which are different in carrier number, number of data or data for compensation.

4. An inverter-drive controlling apparatus in accordance with claim 3, wherein
said data regions, said first timer means and said second timer means are subject to synchronized switchings at the timings of data ends of every one period of the waveform data.

5. An inverter-drive controlling apparatus of simulated sinusoidal wave of unequal width PWM type, wherein PWM signal comprises a data region and a HALT region in each of carrier period which is made by equally dividing the half period of a sinusoidal wave to be simulated by a predetermined integer called a carrier, the apparatus comprising:
first timer means for digitally producing said carrier period responding to desired rotation number of a motor to drive,
second timer means for operating a routine containing plural steps for producing voltage data by using digital first timer means,
voltage fluctuation detecting means for detecting fluctuation of power source voltage,
a memory storing data for one or half period of waveform to generate by an inverter, storing HALT data to stop impressing of voltage to said motor during HALT regions where no said voltage data exists, and storing compensated data of said second timer compensated by output from said voltage fluctuation detecting means, and
inverter output voltage compensation means for compensating output voltage of said inverter basing on said compensation data of said second timer, wherein
initial data access in each carrier period is made by said first timer means and said second timer means and next data access in each carrier period is made by said second timer means, thereby making a compensation of output voltage of said inverter based on said voltage fluctuation, and
said first timer means is provided by a first micro-computer and said second timer means is provided by a second micro-computer.

6. An inverter-drive controlling apparatus in accordance with claim 5, wherein said compensated data is made by step by step compensation of the data by 1 in each routine.

7. An inverter-drive controlling apparatus in accordance with claim 5, wherein
said memory stores at least two different regions storing plural set of data which are different in carrier number, number of data or data for compensation.

8. An inverter-drive controlling apparatus in accordance with claim 7, wherein
said data regions, said first timer means and said second timer means are subject to synchronized switchings at the timings of data ends of every one period of the waveform data.

9. An inverter-drive controlling apparatus of simulated sinusoidal wave of unequal width PWM type, wherein PWM signal comprises a data region and a HALT region in each of carrier period which is made by equally dividing the half period of a sinusoidal wave to be simulated by a predetermined integer called a carrier,
the apparatus comprising:
first timer means for digitally producing said carrier period responding to desired rotation number of a motor to drive,
second timer means for operating a routine containing plural steps for producing voltage data by using digital first timer means,
voltage fluctuation detecting means for detecting fluctuation of power source voltage,
a memory storing data for one or half period of waveform to generate by an inverter, storing HALT data to stop impressing of voltage to said motor during HALT regions where no said voltage data exists, and storing compensated data of said second timer compensated by output from said voltage fluctuation detecting means, and
inverter output voltage compensation means for compensating output voltage of said inverter basing on said compensation data of said second timer, wherein
initial data access in each carrier period is made by said first timer means and said second timer means and next data access in each carrier period is made by said second timer means, thereby making a compensation of output voltage of said inverter based on said voltage fluctuation, and
said first timer means is provided by a first micro-computer and said second timer means is provided by a second micro-computer.

10. An inverter-drive controlling apparatus in accordance with claim 9, wherein
said compensated data is made by step by step compensation of the data by 1 in each routine.

11. An inverter-drive controlling apparatus in accordance with claim 9, wherein
said memory stores at least two different regions storing plural set of data which are different in carrier number, number of data or data for compensation.

12. An inverter-drive controlling apparatus in accordance with claim 9, wherein
said data regions, said first timer means and said second timer means are subject to synchronized switchings at the timings of data ends of every one period of the waveform data.

* * * * *